(12) United States Patent
Arimilli et al.

(10) Patent No.: US 7,073,004 B2
(45) Date of Patent: Jul. 4, 2006

(54) METHOD AND DATA PROCESSING SYSTEM FOR MICROPROCESSOR COMMUNICATION IN A CLUSTER-BASED MULTI-PROCESSOR NETWORK

(75) Inventors: Ravi Kumar Arimilli, Austin, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 10/424,255

(22) Filed: Apr. 28, 2003

(65) Prior Publication Data

US 2004/0215899 A1 Oct. 28, 2004

Related U.S. Application Data

(63) Continuation-in-part of application No. 10/318,514, filed on Dec. 12, 2002.

(51) Int. Cl.
*G06F 12/00* (2006.01)
(52) U.S. Cl. ........................... 710/200; 710/242
(58) Field of Classification Search ........ 710/200, 710/240–244
See application file for complete search history.

(56) References Cited

U.S. PATENT DOCUMENTS

| | | | |
|---|---|---|---|
| 6,591,321 B1 * | 7/2003 | Arimilli et al. | 710/110 |
| 6,889,344 B1 * | 5/2005 | Williams | 714/43 |
| 6,910,062 B1 * | 6/2005 | Arimilli et al. | 709/202 |

* cited by examiner

*Primary Examiner*—Rehana Perveen
*Assistant Examiner*—Clifford Knoll
(74) *Attorney, Agent, or Firm*—Casimer K. Salys; Dillon & Yudell LLP

(57) ABSTRACT

The address tenure for PCR synchronization operations is redefined to support inclusion of the synchronization data within the address tenure. The bits of a particular field within the address tenure (e.g., the address field) are re-allocated to synchronization data, which is known to be small enough to fit within the unused bits. The address tenure is then broadcasted as a normal address operation and is snooped by all of the processors. The snooping logic is designed to recognize regular/normal address tenures and these modified address tenures and respond to a receipt of a modified address tenure by removing the synchronization data stored therein and updating the corresponding register location of the PCR.

29 Claims, 3 Drawing Sheets

| P 310 | PCR ADDR 311 | PCR DATA 312 |

METHOD AND DATA PROCESSING SYSTEM FOR MICROPROCESSOR COMMUNICATION IN A CLUSTER-BASED MULTI-PROCESSOR NETWORK

RELATED APPLICATIONS

This application is a continuation-in-part of U.S. application Ser. No. 10/318,514 filed Dec. 12, 2002.

The present invention is related to the subject matter of the following commonly assigned, copending U.S. patent applications: (1) Ser. No. 10/318,514 entitled "Method, Processing Unit and Data Processing System for Microprocessor Communication in a Multiprocessor System" and filed Dec. 12, 2002; (2) Ser. No. 10/318,515 entitled "Method and Data Processing System for Microprocessor Communication Using a Processor Interconnect in a Multiprocessor System" and filed Dec. 12, 2002; and (3) Ser. No. 10/318,516 entitled "Method and Data Processing System for Microprocessor Communication in a Cluster-Based Multi-processor System" and filed Dec. 12, 2002. The content of the above-referenced applications is incorporated herein by reference.

BACKGROUND OF THE INVENTION

1. Technical Field

The present invention relates in general to data processing and in particular to communication between processors in a data processing system. Still more particularly, the present invention relates to a method, processing unit, and system for providing data updates during processor communication and coordination within a multi-processor data processing system.

2. Description of the Related Art

It is well known in the computer arts that greater computer system performance can be achieved by harnessing the processing power of multiple individual processors in tandem. Multi-processor (MP) computer systems can be designed with a number of different architectures, of which various ones may be better suited for particular applications depending upon the intended design point, the system's performance requirements, and the software environment of each application. Known MP architectures include, for example, the symmetric multi-processor (SMP) and non-uniform memory access (NUMA) architectures.

In modem data processing systems, it is often the case that processes on differing processors must communicate and synchronize their activities. This communication usually is accomplished by means of reads and writes to shared memory variables that are controlled by a number of fencing and synchronization instructions. The various processes read (load) and write (store) to these locations to communicate their status on parallel tasks and coordinate their overall operations.

In shared-memory multi-processor data processing systems, each of the multiple processors in the system may access and modify data stored in the shared memory. In order to synchronize access to these shared data, programming models often require a processor to acquire a so-called "lock" variable associated with the particular shared memory region prior to modifying the shared memory region and to then "release" the lock variable following the modification of the shared data.

A lock variable is, typically, itself, a shared memory location. Processors obtain a lock by first examining the lock variable with a load operation to determine if the lock is already taken. If not taken, the processor can then attempt to obtain the lock by executing a store operation to update the lock to a "taken" value and if successful in that update to then access the shared data. If, however, the lock is already taken by another processor, the current process often continues to read the lock variable until it reads a value indicating the lock is available and that the current processor can attempt to obtain the lock again. Once a processor obtains the lock and has completed accessing the shared data, the processor releases the lock by executing a store to the lock variable setting the lock variable to an "unlocked" state. Such a store will cause, through an appropriate coherency protocol, any other processors to see the new value of the lock variable.

Such techniques are well known to those skilled in the art. Furthermore, in circumstances of high contention in modem cache based multiprocessors, these shared memory lock techniques can lead to a great deal of coherency and data traffic on system interconnection buses to manage the lock variables.

For example, when a lock is released, the coherency protocol must invalidate the current copy, if present, of the cache line holding the lock variable at each processor. Furthermore, each of these processors will then typically attempt to read the lock variable again in an attempt to obtain the lock. This will result in a separate cache intervention or sourcing of the cache line from memory to each participant. As can be seen, when using shared memory for lock variables, a great number of data interventions and cache coherency traffic are required to transfer the data, usually one-by-one, for the lock variables to all the participants in the process. The transactions related to lock variables consume large amounts of interconnect bandwidth and incur high communication latency relative to the small percentage and size of information transmitted through the lock variables.

Current processor communication and sharing of data are made possible through the utilization of buses or wire interconnects running between the various components. These buses communicate operations between the various components (e.g., processors and caches) in the system. Typically, a set of internal buses is utilized to communicate operations and data between internal caches and the processor within a processor chip. For example, most processor chips are designed with integrated L1 and L2 caches. These internal processor buses are utilized to communicate operations and data to and from the processor and the internal L1 and L2 caches.

In addition to these internal processor buses, multiprocessor system typically also include a system level interconnect consisting of one or more buses that are utilized to interconnect the various processor chips to form the multi-processor data processing system. A number of differing topologies may be employed to interconnect these various processor chips. The system interconnect allows for the communication of data and operations between the various processor chips in the multiprocessor data processing system. The system interconnect is typically divided into two distinct paths: one for the transfer of address and control information (i.e. the "address bus") and another for the transfer of data (i.e. the "data bus"). These two distinct paths are often collectively referred to as a single "bus".

Operations are typically placed onto the system interconnect in phases. The first of these phases is typically referred to as an "address tenure" and begins with a processing element placing address and control information for the operation on the address bus portion of the system interconnect. Once placed on the address bus, the operation's address tenure is then typically broadcast to all the other processor chips within the multiprocessing system. At each processor chip, the address tenure is "snooped" and the current processor chip determines if it can honor and/or allow the operation to proceed. Based on this determination, the snooping processor forms a partial snoop response indication that is placed onto the system interconnect for the address operation. This partial response indicates, among other things, whether the operation can be allowed to proceed or not. If the operation cannot be allowed to proceed a "retry" indication is given that states the current snooping processor chip requires that the current snooped operation cannot be allowed to proceed and should be retried again at a later time.

These individual snoop responses are collected up from the various snooping processor chips and combined by the system interconnect to form an overall "combined response" that indicates, at an overall system level, whether the operation can proceed or not. For example, a given processing element may be able to allow an operation to proceed and would not respond with a retry indication. However, another processing element may not be able to allow the operation to proceed and would produce a "retry" snoop response. In this circumstance, the overall combined response will indicate that at least one participant cannot permit the operation to proceed and therefore it must be retried by the initiating processor chip again at a later time. This combined response is communicated back to the initiating processing element concluding the address tenure.

It should be noted that the address bus portion of the system interconnect is typically designed in such a way as to broadcast address tenures to all participants in a multiprocessor as efficiently as possible. That is to say, the address bus topology is designed to make the address and control information associated with a given address tenure visible to all the processing elements within a multiprocessor as quickly and efficiently as possible.

One class of operations within a multiprocessor system are those operations that consist solely only of an address tenure. These operations typically do not involve the explicit transfer of data over the data bus portion of the system interconnect and are typically referred to as "address-only" operations. An address-only operation is completed with the successful completion of the address tenure for that operation as indicated by a good combined response.

However, another class of operations within a multiprocessor system are those operations that involve the explicit transfer of data. These operations consist of an address tenure specifying the type of operation and the address of the operation followed by a data tenure on the data bus portion of the system interconnect to transfer the data. Such operations are called address/data operations. Once the address tenure for an address/data operation has completed successfully, the address tenure is followed by a data tenure on the data bus portion of the system interconnect to transfer the data. The data tenure consists of arbitrating to obtain ownership of the data bus portion of the system interconnect and then transferring the requested data, typically in a series of data "beats", over the data bus portion of the system interconnect.

Unlike the address bus portion of the system interconnect, the data bus portion of the system interconnect is typically not designed to broadcast the transferred data to all participants within the multiprocessor system. Rather, a point-to-point mechanism is employed to more directly route data from the source providing the data (typically a memory controller or a intervening cache controller) to the destination (typically the processing element requesting the data, although on writes the requesting processor typically sources the data to a memory controller). Due to the multi-beat nature of data transfers and the bandwidth required, it is impractical and unnecessary to make any given data transfer visible to all processor chips within the system. Hence, data transfers are typically visible to only the source and destination participants and at most some subset of the other participants that may be topologically "in-between" these participants on the data bus portion of the system interconnect.

In general, once the address tenure portion of an address/data tenure operation is completed, the address bus portion of the system interconnect can continue working on subsequent address tenure operations independent of the completion of the current data tenure on the data bus portion of the system interconnect. A system interconnect that is split into distinct address and data buses and that transmits operations in distinct and potentially independently overlapped phases is known as a "split transaction" bus.

As can be seen from the foregoing, a potentially large number of address tenure and address/data tenure operations may be involved in the management of shared memory lock variables. When many processors are contending to obtain a lock, many address/data tenure transfers will be required to transfer the value of the lock cache line to the participating processor chips which will then likely cache the lock variable value. When a lock is released due to a store, these cached copies will be invalidated causing the participating processors to attempt to re-acquire the lock. This action will typically require a separate new address/data tenure operation to again transfer the cache line containing the lock variable to each participant as said participants attempt to acquire the lock. The leads to long interconnect latencies and significant use of interconnect bandwidth and resources.

Therefore, the present invention recognizes that a need exists for an efficient mechanism to complete data transfer between processors without the latencies involved with current processor-to-processor data communication protocols. A system in which the processors each maintain a separate communication register for direct inter-processor communication and for concurrently updating these communication registers in a broadcast rather than point-to-point fashion would be a welcomed improvement. These and other benefits are provided by the invention described herein.

SUMMARY OF THE INVENTION

Disclosed is a method, processor and multi-processor (MP) system for enabling fast and efficient updates of synchronization data stored within processor communication registers (PCRs) of individual processors of a multi-processor data processing system. A modified address tenure is provided that includes an indication that the address tenure is a PCR-targeted address tenure as well as the synchronization data being updated within the individual PCRs. The modified address tenure is broadcast on the address bus and snooped by each processor concurrently.

In one embodiment, one of the un-used TTYPE codepoints within the address operation is selected to identify when the address tenure is a normal address tenure or a modified address tenure. The processor issuing the update sets the bit prior to forwarding the modified address tenure on the bus for broadcast. In another embodiment, a bit is appended to the address tenure, and the value of the bit indicates to the snoopers whether the address tenure is a modified or a normal address tenure.

Selection of which unused bits within the address tenure to allocate for transferring synchronization data is a design feature, which depends on the actual size of the data being transferred and the number of processors or PCRs in the system that each require unique addressing.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
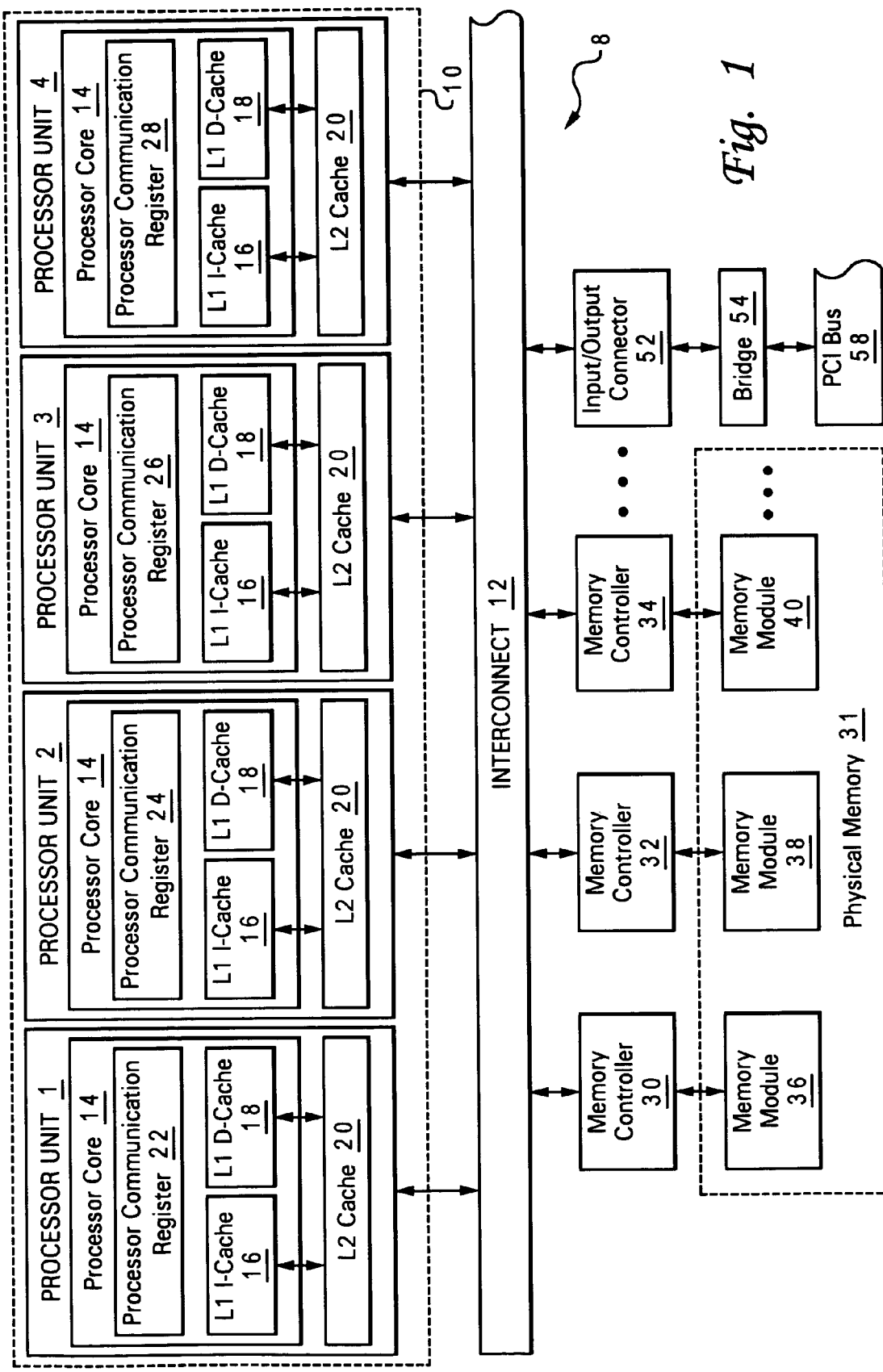
FIG. 1 depicts a high-level block diagram of a multiprocessor data processing system that supports microprocessor communication via processor communication registers (PCRS) in accordance with one embodiment of the present invention.

The present invention is implemented, among other places, within the multi-processor (MP) configuration described in the related applications in which each processor in the MP is designed with a processor communication register (PCR). The relevant content of the related applications are incorporated herein by reference. As noted within these related applications, it is often the case where there are a small number of critical synchronization variables that are shared by a large number of the processors (for example, for a hypervisor). For these cases, special registers that are duplicated within every chip are provided and referred to as PCRs. With these PCRs, each chip accomplishes read operations to it's own local copy of the register and a processor which writes to the register updates all the copies of the registers within all processor chips.

To efficiently support these duplicated registers, a means needs to be provided to allow for the registers to be efficiently updated on writes. One way to accomplish this register update is to use a traditional address/data tenure to individually address and then write the PCR within each chip. However, since such data transfers are typically routed in a point to point fashion, such a mechanism would require repeated address/data tenures to update each processor chip within the multiprocessor. Such a mechanism would, therefore, be inefficient and wasteful of scarce bus bandwidth and resources.

The invention itself provides a method and system within the MP designed according to the related applications by which data updates to the replicated PCRs are communicated via a broadcast of a modified address tenure, containing the write data, on the address bus. Thus, unlike other data update mechanisms that involve an address tenure followed by a data tenure, the invention enables the write data to be embedded within the modified address tenure and broadcast to each of the other PCRs. Utilization of the address tenure eliminates the need for a separate data tenure or tenures, and furthermore, allows for the update of all the PCRs within a single address tenure due to the fact that address tenures are broadcast to all chips within the system. The mechanism provided by the invention takes advantage of the fact that the small number of bytes within a PCR in a typical system means they require relatively small addresses for individual identification of data to be written in the PCR. Thus, the standard address tenure utilized by the processors would necessarily include a number of un-utilized bits, which may be re-allocated to carry the write data for the PCR update operation.

In order for the invention to operate, two conditions must be satisfied: (1) the PCR write data has to be a relatively small amount of data (i.e., capable of being transferred within the unused portion of a single address tenure); and (2) the number of bytes within a PCR has to be sufficiently small so that the set of unique addresses required does not occupy a large portion of the bits within the address tenure. The first condition is most probably fulfilled for all synchronization type data since the lock variables tend to be a single byte or small number of bytes. The second condition is most probably fulfilled owing to the fact that PCRs are designed to hold only a small number of bytes of data. Data that requires larger storage than is available in the PCRs are stored in the caches and memory.

With reference now to the figures and in particular with reference to FIG. 1, there is illustrated a high-level block diagram of a multiprocessor (MP) data processing system that supports microprocessor communication, in accordance with one embodiment of the present invention. As depicted, data processing system 8 includes a number of processing units 10 coupled for communication by a system interconnect 12. As depicted in the embodiment of FIG. 1, processing units 10 contains four processor units 1–4 for exemplary purposes; however, the preferred embodiment is not limited by any number of processor units and the invention will support any number or type of processor units. The present invention could be implemented in a data processing system having any number of processor units, for example, including 2, 4, 8, 16, 32, etc. processors in the multi-processor system. Each processing unit 10 is an integrated circuit including one or more processor cores 14. In addition to registers, instruction flow logic and execution units utilized to execute program instructions, each of processor cores 14 includes associated level one (L1) instruction and data caches 16 and 18, which temporarily buffer instructions and operand data, respectively, that are likely to be accessed by the associated processor core 14.

As further illustrated in FIG. 1, the memory hierarchy of data processing system 8 also includes the physical memory 31, comprising one or more memory modules (shown as memory modules 36, 38 and 40), which form the lowest level of volatile data storage in the memory hierarchy, and one or more lower levels of cache memory, such as on-chip level two (L2) caches 20, which are utilized to stage instructions and operand data from physical memory 22 to processor cores 14. As understood by those skilled in the art, each succeeding lower level of the memory hierarchy is typically capable of storing a larger amount of data than higher levels, but at higher access latency. As shown, physical memory 31, which is interfaced to interconnect 12 by memory controllers 30, 32 and 34, may store operand data and portions of one or more operating systems and one or more application programs. Memory controllers 30, 32 and 34 are coupled to and control corresponding memory modules 36, 38 and 40, respectively.

Also shown is input/output connector 52, which operates in a similar manner as processing units 10 when performing direct memory access operations to the memory system. As will be appreciated, the system may have additional input/output connectors, equal to input/output connector 52, connected to interconnect 12. As various input/output devices, such as disk drives and video monitors, are added and removed on PCI bus 58 (or other similar attached buses), input/output connector 52 operates to transfer data between PCI bus 58 and interconnect 12 through bridge 54.

Those skilled in the art will appreciate that data processing system 8 can include many additional un-illustrated components, such as I/O adapters, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of any architecture and are in no way limited to the generalized MP architecture illustrated in FIG. 1.

In accordance with the illustrative embodiment, processor units 1-4 each contain a processor communication register (PCR) 22, 24, 26, and 28, respectively. Each PCR 22–28 stores identical information that is useful to the processors in a multi-processor system, such as processor communication information used to coordinate pipelined or parallel multi-processing. Each PCR 22–28 is often a four-byte register that can be read by its associated processor unit. The various PCR registers are updated by write operations to the PCR by the various processors. When a given processor writes to a PCR location, that location is updated in all the PCR registers preferable utilizing the modified address tenure and broadcast update method of the present invention.

By the operation of the processor units, each PCR 22–28 is continually updated by write operations initiated by the processor units thereby allowing each of processor units 1–4 to see changes within the PCR data and thereby coordinate their operations. Additional functional features of the PCRs and different MP topologies within which the PCRs are utilized are provided in the related applications and are not the focus of the present invention.

As will be appreciated, the present invention substantially enhances efficiency within a multi-processor system by allowing processor communications to be immediately transferred into all processors without momentarily restricting access to the information or forcing all the processors to be continually contending for the same cache line, which typically overwhelms the interconnect and memory system with a stream of load, store, retry and invalidate commands. The present invention further enhances efficiency by broadcasting the PCR updates at one processor to the PCRs of this processor and of the other processors within a single address tenure rather than utilizing a series of standard point-to-point address data tenures.

Figure 3A:
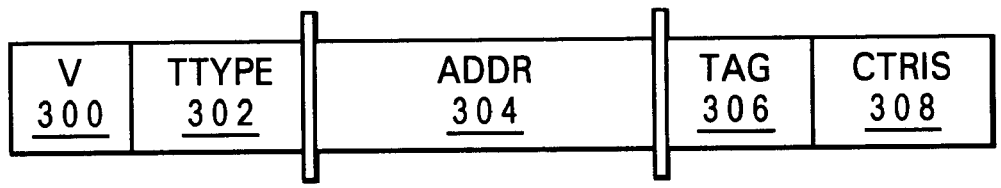
FIGS. 3A and 3B respectively illustrate bit allocations within an address tenure utilized for both normal and modified address operations including PCR data transfer in accordance with one embodiment of the present invention.

The invention modifies the bus protocol such that certain bits of the address tenure are reallocated to transmit PCR register addresses and data values for PCR write operations. With reference now to FIG. 3A, there is shown exemplary bit fields within an address tenure. V field 300 may be a one bit field indicating whether the bits represent a valid address tenure. TTYPE field 302 is typically a multi-bit field indicating the type of operation transmitted by the address tenure. In typical implementations, the TTYPE field has available a number of unused codepoints that may be assigned to new operations. ADDR field 304 is a field typically used to address main memory within the computer system for those operations that read or alter main memory. In modem data processing systems, ADDR field 304 is typically on the order of 32 to 50 bits in width. TAG field 306 is typically a field utilized to indicate the source (processor chip and unit within the processor chip) of the operation transmitted by the address tenure. CTRLS field 308 is usually a field that contains additional control information associated with the address tenure.

Figure 3B:
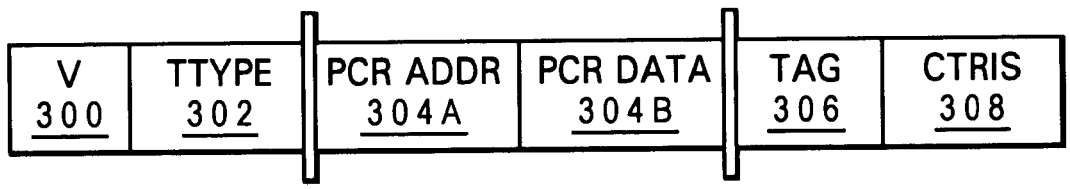

In one possible embodiment of the present invention, it is noticed that the ADDR field 304 contains far more bits than are typically necessary to address the PCR facilities within a processor. With reference now to FIG. 3B, there is shown an alternative address tenure that is utilized to communicate PCR write operations in one embodiment of the present invention. In FIG. 3B, ADDR field 304 is redefined for PCR write operations to be PCR_ADDR field 304*a* and PCR_DATA field 304*b*. Since the number of bits needed to address the PCR facilities is much lower than the number of bits needed to address main memory, these additional bits can be reallocated to carry the PCR write data value.

In addition, the range of legal values for TTYPE field 302 is expanded to include a transaction type codepoint indicating a PCR_WRITE operation. It should be noted that no address bus tenure need be defined for read operations to a PCR. Such operations are satisfied locally to the processor by reading data from the local PCR register copy. When TTYPE field 302 indicates a PCR write operation, the PCR_ADDR and PCR_DATA fields are examined by snooping logic associated with the PCR registers as described below to perform updates of the PCR registers upon receipt of the modified address tenure.

It will be appreciated by those skilled in the art that other unused fields aside from the address field within a data tenure could also be reallocated to transfer data within the modified address data tenure. Furthermore, those skilled in the art will recognize that the number of bits needed to address the PCR registers and encode the data for a PCR write may not exactly match the size of existing address field 304. In such a circumstance, the unused bits can be left undefined in the modified address tenure PCR write operations of the current invention.

In the embodiment of present invention depicted in FIG. 3B, the amount of data that can be transferred is limited by the number of available unused bits in address field 304. However, the alterations required to an existing protocol are less invasive. In an alternate, more invasive, embodiment of the present invention, an additional unique bit field is added to the address tenure to indicate the presence of a PCR write operation. This bit serves to indicate both the presence of a valid operation and the fact that this operation is a PCR write operation. All other bits within the address tenure may then be reallocated to indicate the PCR write address and the PCR write data.

Figures 3C, 4:
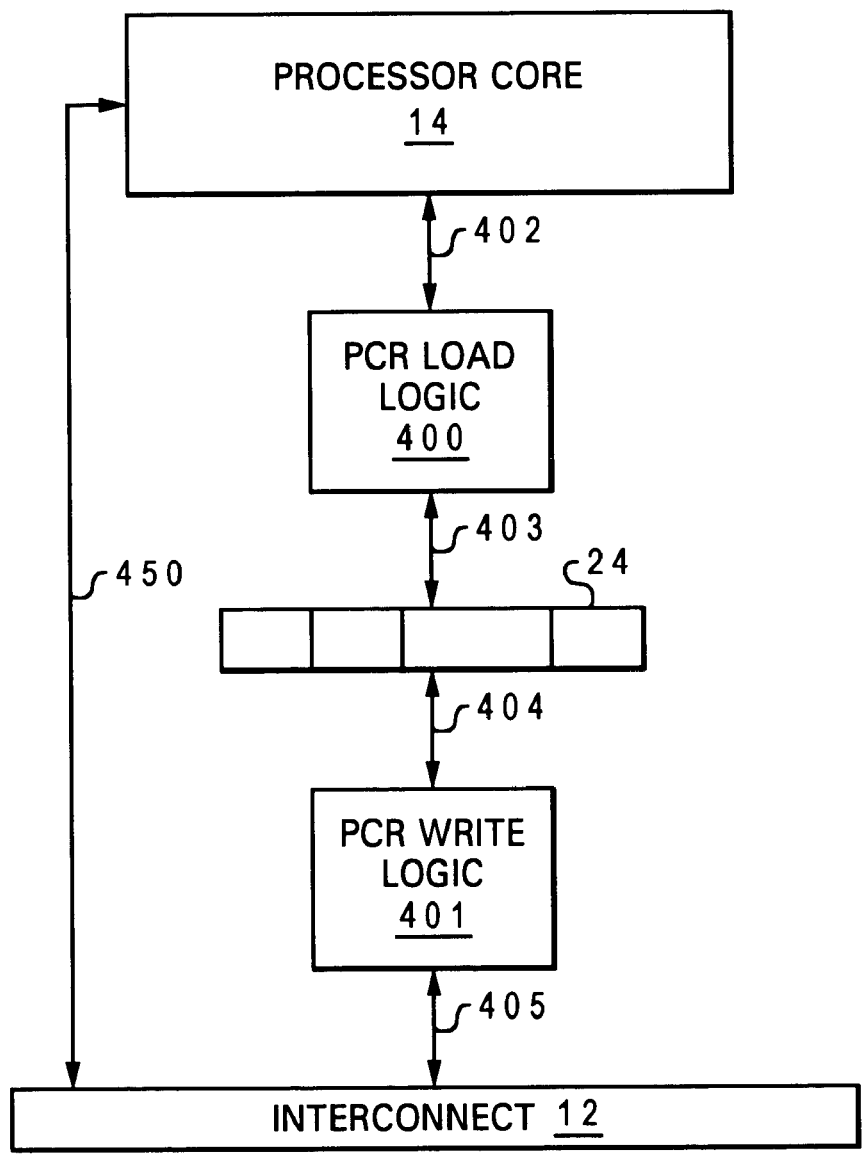
FIG. 3C illustrates the bit allocation of an address tenure having an appended indicator bit utilized to indicate when the address tenure is being utilized as a modified address tenure in accordance with one embodiment of the invention.
FIG. 4 is a block diagram illustrating hardware connectivity between the processor core, PCR, and the interconnect bus for completing PCR updates according to one embodiment of the present invention.

With reference now to FIG. 3C, there is shown an alternate address tenure format supporting PCR write operations. Added single bit P field 310 is utilized to indicate the presence of a valid PCR write operation. If P field 310 has the value "0", the other bits within the address tenure are interpreted according to the format and meanings described in FIG. 3A. However, if P field 310 has the value "1", all remaining bits within the address tenure are redefined to indicate the address and data values for a PCR write operation. PCR_ADDR field 311 indicates the address of the PCR write operation and PCR_DATA field 312 indicates the data value for the PCR write operation. In this manner additional address tenure data bits can be allocated to transmitting the PCR write operation thus supporting larger PCR write data sizes.

With reference now to FIG. 4, there is depicted in greater detail the functional logic blocks utilized to support read and write operations to a given PCR register 24. To process load operations to a PCR, processor core 14 communicates through bus 402 to PCR load logic 400. PCR load logic 400 decodes the address of the desired PCR register and obtains the value of said portion of the PCR register over bus 403 and ultimately returns this data to processor core 14 over bus 402.

Likewise, to process a snooped PCR write operation, PCR write logic receives a modified address tenure from system interconnect 12 over bus 405. PCR write logic 401 then decodes PCR_ADDR field 304a or 311 (depending on the implementation) to determine the desired locations within PCR 24 to be updated. PCR write logic 401 then updates PCR 24 accordingly, utilizing the data provided in PCR_DATA field 304b or 312. It should be noted that PCR write logic 401, in contrast to logic supporting many other snooped operations in multiprocessor, is "non-blocking". That is to say, unlike other address tenures, no retry indication will typically be given to a PCR write modified address tenure. PCR write logic 401 is typically constructed in such a fashion as to be able to accept PCR write operations from system interconnect 12 at the highest rate possible without the need for retries. This non-blocking implementation saves significant latency that could accrue due to retries and design complexity. In the case of PCR registers, unlike normal cache entries in L1 or L2 caches, it is a usually straightforward matter to implement the PCR write logic in such a non-blocking fashion.

Likewise, it should be noted that PCR write operations are typically initiated from processor core 14 by means of bus 450 directly connected to interconnect 12. In this manner, all PCRs, including the PCR associated with the initiating processor can be updated by means of PCR write logic block 401. At any given processor unit, PCR write logic block 401 is necessary to process PCR updates originating at other processors. It is therefore advantageous to re-utilize PCR write logic block 401 to facilitate updates of the local PCR register by snooping these transactions from system interconnect 12 rather than creating a unique path to cause local PCR register updates.

Figure 2:
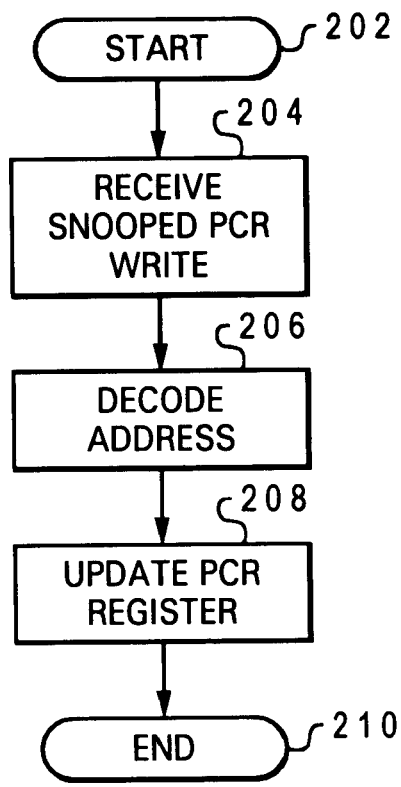
FIG. 2 is a flow chart illustrating the process by which the PCRs of FIG. 1 are updated in accordance with one embodiment of the present invention.

With reference now to FIG. 2, there is shown a flowchart depicting the operation of PCR 24 in response to a snooped PCR write operation. The process begins at block 202 and thereafter proceeds to block 204, which depicts a processor receiving a snooped PCR write operation. The PCR write operation is a modified address tenure that includes the updated data to be written to the PCR register. The address within the snooped PCR write is decoded as indicated at block 206, and then the corresponding block within the PCR register is updated with the data from the PCR write operation as shown at block 208. Following the update, the process ends as shown at block 210.

While the invention has been particularly shown and described with reference to a preferred embodiment, it will be understood by those skilled in the art that various changes in form and detail may be made therein without departing from the spirit and scope of the invention.

What is claimed is:

1. In a multiprocessor system having a plurality of processors interconnected by a system bus, a method for enabling efficient exchange of data between processor communication registers (PCRs) maintained by two or more of the plurality of processors, said method comprising:
at a first processor, modifying an address operation to include data to be updated within the PCRs; and
broadcasting the modified address operation to the system bus, wherein each processor snoops said modified address operation and updates a respective register with said data.

2. The method of claim 1, further comprising:
responsive to a receipt of the modified address operation, updating an address space within a local PCR with said data retrieved from within said modified address operation.

3. The method of claim 1, wherein said modifying step further comprises:
storing said data in a pre-selected location within said address operation, said pre-selected location including bits selected from among one or more of a TTYPE field, an address field, a tag field and a control field of said address operation.

4. The method of claim 3, wherein said modifying step includes:
storing address information in a first portion of the address field, wherein said address information occupies only said first portion of said address field, which comprises a second portion of unused bits; and
storing said data within said unused bits of the address field of said address operation.

5. The method of claim 2, further comprising:
snooping an address operation from a second processor;
identifying whether said address operation is a second modified address operation; and
when said snooped address operation is a second modified address operation, immediately extracting data from within said second modified address operation and storing said data within a pre-designated location within said PCR.

6. The method of claim 1, further comprising:
upon receipt of an address operation, checking the value of a pre-designated bit within the received address operation; and
when the value of the pre-designated bit indicates that said address operation is a modified address operation with data, initiating an extraction of said data from within said address operation.

7. The method of claim 6 further comprising:
setting a bit within the TType field designated as the pre-designated bit to indicate to a snooping processor that a received address operation is a modified address operation.

8. The method of claim 6, further comprising:
appending a bit to said address operation as the pre-designated bit;

setting a value of said appended bit during generation of the address operation, wherein the value of said bit indicates whether said address operation is a modified address operation containing data or a standard address operation without data.

9. The method of claim 1, further comprising:
identifying one selected location of a plurality of locations within the register in which said data is to be stored from, wherein said identifying step involves retrieving the register location information from within the tag field of the address operation; and
forwarding the updated data to the one selected location of each of the registers.

10. The method of claim 9, wherein said registers are processor communication registers.

11. In a multiprocessor system (MP) having a plurality of processors interconnected by a system bus, a system for enabling efficient exchange of data between processor communication registers (PCRs) of the plurality of processors, said system comprising:
means for storing data within a modified address operation generated at a first processor;
means for broadcasting the modified address operation to each PCR of processor within said MP, wherein a copy of said data is automatically placed within a corresponding register location within each of said PCRs.

12. The system of claim 11, further comprising:
means for identifying the corresponding register location via a tag field within the modified address operation;
means for reading said data from within said modified address operation and forwarding the updated data to the corresponding register location of each of said PCRs.

13. The system of claim 11, wherein said means for storing further comprises:
means for storing said data in un-used bits of a pre-designated location within said address operation, selected from among one or more of a TTYPE field, an Address field, a Tag field and a control field of said address operation.

14. The system of claim 12, further comprising:
means for receiving an address operation from a second processor;
means for identifying whether said address operation is a second modified address operation; and
means, when said second modified address operation is received, for immediately extracting data from within said modified address operation and storing said data within an identified location within said PCR.

15. The system of claim 11, further comprising:
means for appending a bit to said address operation, wherein a value of said bit indicates whether said bit is utilized as a modified address operation containing data or a standard address operation without data; and
when said address operation is begin generated as a modified address operation, said system further comprises:
means for setting the value of said bit to indicate a modified address operation; and
means for re-allocating bits within said address operation, wherein said modified address operation includes said bit value, a PCR address and corresponding PCR data.

16. The system of claim 11, further comprising:
means for determining from which processor said modified address operation originated by checking a tag field; and
means for selecting a location within said PCRs assigned to said processor as the location whose data is updated with said data.

17. In a multiprocessor data processing system, having a first processor and a plurality of snooping components interconnected via a system bus, a method for enabling efficient transfer of synchronization data to each of the first processor and the plurality of snooping components, said method comprising:
at the first processor, modifying an address operation to include synchronization data required by said first processor and at least one of said plurality of snooping components;
issuing a broadcast of said modified address operation as an address tenure on the system bus, wherein said modified address operation is snooped by each of said first processor and said one snooping component; and
extracting said synchronization data from within said modified address operation, wherein said synchronization data is transmitted on the system within an address tenure.

18. The method of claim 17, said modifying step further comprising:
determining that said synchronization data meets pre-established criteria for inclusion within a modified address tenure, wherein said pre-established criteria includes relatively small data size, available un-used bits within the address tenure, non-memory access data, and known targets with logic for data retrieval;
setting a pre-designated bit within said address operation to signal to a snooping component that said address operation is a modified address operation carrying synchronization data.

19. The method of claim 17, wherein said pre-designated bit selected in said setting step is selected from among an un-used TTYPE codepoint bit and an appended bit, wherein when said appended bit is utilized, bits of said address operation are re-allocated to specify an address field and synchronization data field.

20. The method of claim 17, wherein said first processor includes a snooper and a synchronization register and said method further comprises updating said synchronization register via snoops of modified address operations on said system bus, including said modified address operation issued by said first processor.

21. A multi-processor data processing system comprising:
a first processor and a second processors, each having a processor communication register (PCRs) for sharing synchronization data; and
a system bus interconnecting said first processor and said second processor;
wherein said first processor includes processor logic for enabling efficient exchange of data between respective PCR, said processor logic including:
means for storing updated data within a modified address operation generated at the first processor;
means for broadcasting the modified address operation to each PCR within said MP via said system bus, wherein a copy of said updated data is automatically placed within a corresponding register location within each of said respective PCR.

22. The data processing system of claim 21, further comprising:
means for identifying the corresponding register location via a tag field within the modified address operation;
means for reading said corresponding register location from within said modified address operation and forwarding the updated data to the corresponding register location of each of said PCRs.

23. The data processing system of claim 21, further comprising:
responsive to a receipt of the modified address operation, means for updating an address space within a local PCR with said data from within said address operation.

24. The data processing system of claim 21, wherein said means for modifying further comprises:
means for storing said data in un-used bits of a pre-selected location within said address operation, selected from among one or more of a TTYPE field, an Address field, a Tag field and a control field.

25. The data processing system of claim 24, wherein said means for modifying includes:
means for adding said data within unused bits of an address field of said address operation.

26. The data processing system of claim 24, further comprising:
means for receiving an address operation from a second processor;
means for identifying whether said address operation is a second modified address operation; and
means, when said second modified address operation is received, for immediately extracting data from within said second modified address operation and storing said data within an identified location within said PCR.

27. The data processing system of claim 21, further comprising:
means for appending a bit to said address operation, wherein a value of said bit indicates whether said address operation is a modified address operation containing data or a standard address operation without data.

28. The data processing system of claim 27, wherein when said address operation is begin generated as a modified address operation, said data processing system further comprises:
means for setting the value of said bit to indicate modified address operation; and
means for re-allocating bits within said address operation, wherein said modified address operation includes said bit value, a PCR address and PCR data.

29. The data processing system of claim 21, further comprising:
means for determining from which processor said modified address operation originated by checking a TAG field; and
means for selecting a location within said PCRs assigned to said processor as said selected location.

* * * * *